United States Patent
Pevny et al.

(10) Patent No.: US 10,375,143 B2
(45) Date of Patent: Aug. 6, 2019

(54) LEARNING INDICATORS OF COMPROMISE WITH HIERARCHICAL MODELS

(71) Applicant: Cisco Technology, Inc., San Jose, CA (US)

(72) Inventors: Tomas Pevny, Praha-Modrany (CZ); Petr Somol, Marianske Lazne (CZ)

(73) Assignee: Cisco Technology, Inc., San Jose, CA (US)

( * ) Notice: Subject to any disclaimer, the term of this patent is extended or adjusted under 35 U.S.C. 154(b) by 340 days.

(21) Appl. No.: 15/248,252

(22) Filed: Aug. 26, 2016

(65) Prior Publication Data
US 2018/0063163 A1    Mar. 1, 2018

(51) Int. Cl.
*H04L 29/06* (2006.01)
*H04L 29/08* (2006.01)

(52) U.S. Cl.
CPC .......... *H04L 67/02* (2013.01); *H04L 63/1425* (2013.01)

(58) Field of Classification Search
CPC .... G06F 17/50; G06F 2217/16; G06F 19/321; G01R 33/5608; G01R 33/56341; H04L 61/103; H04L 61/2015; H04L 63/0281; H04L 63/1416; H04L 63/1425; H04L 67/02; H04L 67/22; H04L 67/303
See application file for complete search history.

(56) References Cited

U.S. PATENT DOCUMENTS

| | | | |
|---|---|---|---|
| 7,296,288 B1 | 11/2007 | Hill et al. | |
| 8,555,383 B1 | 10/2013 | Marshall et al. | |
| 2010/0284283 A1* | 11/2010 | Golic | H04L 63/1416 370/242 |
| 2012/0210423 A1* | 8/2012 | Friedrichs | G06F 21/564 726/22 |
| 2014/0280898 A1 | 9/2014 | Voit et al. | |
| 2017/0099314 A1* | 4/2017 | Klatt | H04L 63/1433 |

* cited by examiner

*Primary Examiner* — Abiy Getachew
(74) *Attorney, Agent, or Firm* — Edell, Shapiro & Finnan, LLC

(57) ABSTRACT

Presented herein are techniques for classifying devices as being infected with malware based on learned indicators of compromise. A method includes receiving at a security analysis device, traffic flows from a plurality of entities destined for a plurality of users, aggregating the traffic flows into discrete bags of traffic, wherein the bags of traffic comprise a plurality of flows of traffic for a given user over a predetermined period of time, extracting features from the bags of traffic and aggregating the features into per-flow feature vectors, aggregating the per-flow feature vectors into per-destination domain aggregated vectors, combining the per-destination-domain aggregated vectors into a per-user aggregated vector, and classifying a computing device used by a given user as infected with malware when indicators of compromise detected in the bags of traffic indicate that the per-user aggregated vector for the given user includes suspicious features among the extracted features.

15 Claims, 5 Drawing Sheets

US 10,375,143 B2

LEARNING INDICATORS OF COMPROMISE WITH HIERARCHICAL MODELS

TECHNICAL FIELD

The present disclosure relates to network security, and more particularly to the use of neural networks to identify indicators of compromise (IOCs) in connection with discovery of malware.

BACKGROUND

Enterprise networks can easily become infected with viruses and malware, particularly as the types and number of applications proliferate over the Internet. Keeping track of and preventing viruses and malware has, accordingly, become increasingly difficult.

Traditionally, signature-based security devices, firewalls, or anti-viruses are deployed to detect such threats. However, signature-based algorithms simply compare a byte sequence that has been detected to stored byte-sequences corresponding to known threats, which may be in a database. Thus, if a new threat has not yet been analyzed and recorded into the database, the signature based algorithm may not identify the new threat. Furthermore, if a threat has the ability to change, the signature-based algorithms may again fail to identify the threat because a current signature of the same threat may be different from a stored signature of the same threat that was recorded earlier. Thus, polymorphic malware, zero-day attacks by threats that are novel or previously unseen, or other types of advanced persistent network threats are usually not detected or blocked by signature-based security algorithms.

DESCRIPTION OF EXAMPLE EMBODIMENTS

Overview

Figure 1:
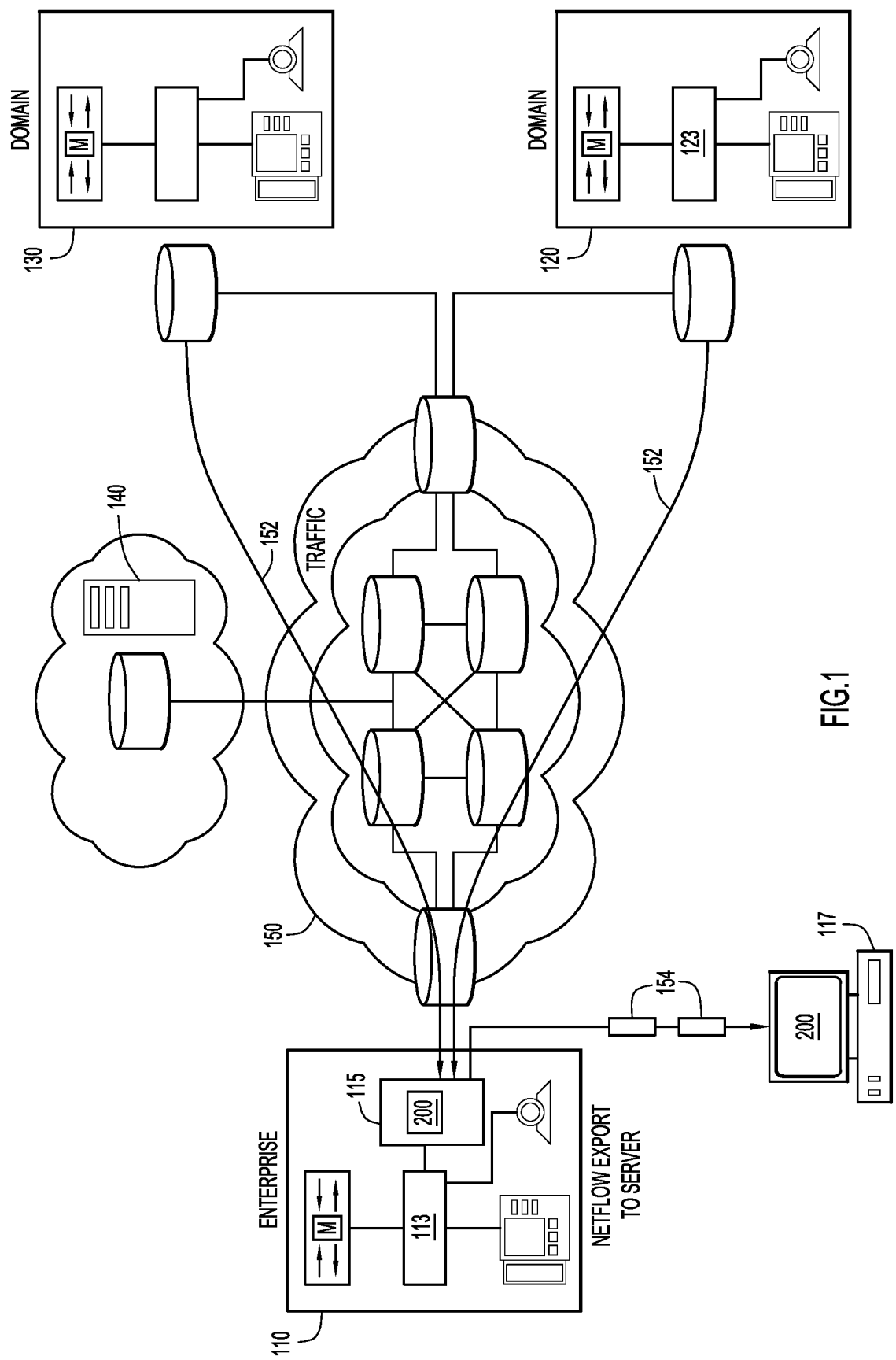
FIG. 1 illustrates an example operating environment in which an embodiment may be implemented.

Presented herein are techniques for classifying devices as being infected with malware based on learned indicators of compromise. A method includes receiving at a security analysis device, traffic flows from a plurality of entities destined for a plurality of users, aggregating the traffic flows into discrete bags of traffic, wherein the bags of traffic comprise a plurality of flows of traffic for a given user over a predetermined period of time, extracting features from the bags of traffic and aggregating the features into per-flow feature vectors, aggregating the per-flow feature vectors into per-destination domain aggregated vectors, combining the per-destination-domain aggregated vectors into a per-user aggregated vector, and classifying a computing device used by a given user as infected with malware when indicators of compromise detected in the bags of traffic indicate that the per-user aggregated vector for the given user includes suspicious features among the extracted features.

An apparatus is also presented and includes a network interface unit configured to enable communications via a network, a memory configured to store logic instructions, and a processor, when executing the logic instructions, configured to receive traffic flows from a plurality of entities destined for a plurality of users, aggregate the traffic flows into discrete bags of traffic, wherein the bags of traffic comprise a plurality of flows of traffic for a given user over a predetermined period of time, extract features from the bags of traffic and aggregating the features into per-flow feature vectors, aggregate the per-flow feature vectors into per-destination domain aggregated vectors, combine the per-destination-domain aggregated vectors into a per-user aggregated vector, and classify a computing device used by a given user as infected with malware when indicators of compromise detected in the bags of traffic indicate that the per-user aggregated vector for the given user includes suspicious features among the extracted features.

Example Embodiments

A problem preventing a wider use of machine learning in network intrusion detection is the difficulty of obtaining accurate labels on the level of individual network connections (Terminal Control Protocol (TCP) flow, Hypertext Transfer Protocol (HTTP) request, etc.). Even for an experienced security officer it is almost impossible to determine which network connections are caused by malware and which by a benign user or an application. Moreover, malware often exhibits itself by performing seemingly innocent connections. For example, it might connect to google.com to verify if the computer is connected to the network (connection check), or it may display advertisements to render money for malware authors, etc. These problems in obtaining true labels on level of individual connections makes automatic and large-scale training of accurate classifiers for a given type of network traffic very difficult.

To address the foregoing, described herein is a hierarchical classifier where lower layers detect a type of traffic typical for the malware, and upper layers learn that certain combinations of the traffic are very typical for infected hosts. The advantage of this hierarchy is that accuracy of classifiers on lower layers can be relatively low, but their combination performed in upper layers tends to make the overall classifier (detector) very accurate. Further, in an embodiment, the classifier may be trained with labels provided on the level of user, i.e., it can be determined that a given computer is clean, or another one is infected, all while also determining which connections were more likely caused by malware and which ones were more likely caused by a user or a legitimate system process.

More specifically, the embodiments described herein train a Machine Learning (ML) system (e.g., a neural network) based on collectable data from an arbitrarily large computer network where the human analyst input merely includes verdicts on a network node level—i.e., an analyst identifies nodes (corresponding to users) that are likely infected, without providing any further detail. The instant embodiments analyze traffic logs, sys logs and possibly other information, and discover patterns that are significant in distinguishing the suspicious nodes from the presumed benign ones. Subsequent to this training stage, the ML system uses the discovered patterns to make verdicts about future infections in network nodes.

FIG. 1 illustrates an example operating environment in which an embodiment may be implemented. In FIG. 1, network traffic 152 between an enterprise 110 and external domains 120, 130 is depicted. Domains 120, 130, may be devices such as, as servers (e.g., web servers, and the like) with which computers within the enterprise 110 communicate.

The computer system 113 in enterprise 110 may initiate communication with, e.g., computer system 123 of domain 120 through a gateway or proxy device 115 that is connected to the Internet 150. That same traffic 152, in the form of packet flows 154, may also be provided to a central server computer 117.

In an example of a network threat incident, computer system 140, also connected to Internet 150, may be a source of a network attack. That is, computer system 140 may be configured to spoof domains 120 and 130. Those skilled in the art will appreciate that domains 120 and 130 may, however, themselves, be a source of a network attack, which may have been able to penetrate enterprise 110. Thus, the packet flows from computer system 123 (or 140) to enterprise computer system 113 may contain malicious network attack packets. In order to detect the network threat, malware detection logic 200 may be part of gateway system 115, in an embodiment. As the traffic 152 is received by gateway system 115, the malware detection logic 200 may analyze the traffic using the techniques described herein.

In another embodiment, the malware detection logic 200 may be hosted in a separate computer system such as central server computer 117. In this configuration, the malware detection logic 200 may import packet flow log data or files ("logs") and analyze them rather than receiving packet flows 154 directly from the network. For example, the malware detection logic 200 may receive logs from gateway system 115. Thus, using techniques described herein, the malware detection logic 200 may detect the network threat incident on computer system 113 and also may trace the incident to the originating computer system 140 or 123. In a specific implementation, malware detection logic 200 may be configured to learn indicators of compromise (IOCs) via a neural network and thereby determine whether a given computer system (e.g., computer system 113) is infected with malware or not.

In an embodiment, malware detection logic 200 is configured to learn a security breach from training data. Notably, the number of needed labels in training data to be provided by humans is effectively much lower than usual in standard ML techniques due to the label coverage of groups of samples ("bags") instead of single samples, i.e., groups of (groups of . . . ) samples. Each bag can consist of an arbitrary number of samples and thus vectors arranged with such samples may be of arbitrary size. This enables automatic learning from large data sets. Malware detection logic 200 is further configured to automatically reveal to human analysts previously unknown patterns in data that signify malicious activity (i.e., automatically discover previously unknown IOCs).

Malware detection logic 200 may be implemented in the form of a multi-layer feed-forward neural network (NN) trained by back-propagation. The neural network according to the instant embodiments, consumes traffic data in a hierarchy of "bags."

That is, individual samples are represented by vectors obtained by extracting numeric features from source network data (e.g., logs). Which features are employed depends on the type of domain/network being analyzed. Thus, for example, in the case of telemetry, features may include, e.g., n-gram statistics from URL strings, bytes received, bytes sent, etc. In the case of a sandbox, captured features may include, e.g., timings of system calls, size of allocated resources, etc.

No individual labels (benign/malicious) need to be known for individual samples in the training set. Only coarser labels are needed on the top-most bag level, marking bags as presumed benign or presumed malicious; here benign or malicious does not mean that all samples in a bag are of the same type—it is only assumed that the distribution of samples in malicious bags is in some (unknown) way different from the distribution of samples in benign bags.

Hidden NN layers are designed to model patterns inside bags. The hierarchy of NN layers reflects the hierarchy of bags. Note that the number of neurons in hidden NN layers may be manually selected, keeping in mind that it should be high enough to cover the possible variety of patterns that can be expected to appear in input data.

A notable feature of malware detection logic 200 is in its approach to learning. In standard NNs every sample consists of one input vector. As such, every neuron reads the input vector representing one sample and immediately computes and passes one output value to the next layer. In the instant embodiments, each sample consists of multiple input vectors. Every neuron processes all input vectors of one sample, computes their respective output values, and only when all input vectors from a sample have been read the neuron aggregates all computed output values to a single output value representing the whole sample. This is then passed to the next layer as the neuron's output. Note that the aggregation function may be selected so as to enable calculation of partial derivatives with respect to its input and possibly with respect to internal parameters. This ensures proper operation of the back-propagation operations.

User-Centric System Based on Telemetry Data

The ultimate goal of the instant embodiments is to achieve high accuracy of detecting users infected by malware where the detection is based on traffic logs (e.g., HTTP proxy logs, statistics provided by network devices through NetFlow protocol) of user's network activity. In the tested embodiment, individual samples are HTTP(s) requests. Lower level bags are viewed here as collections of requests from one user to one domain. Higher level bags then represent all traffic of one user.

Figure 2:
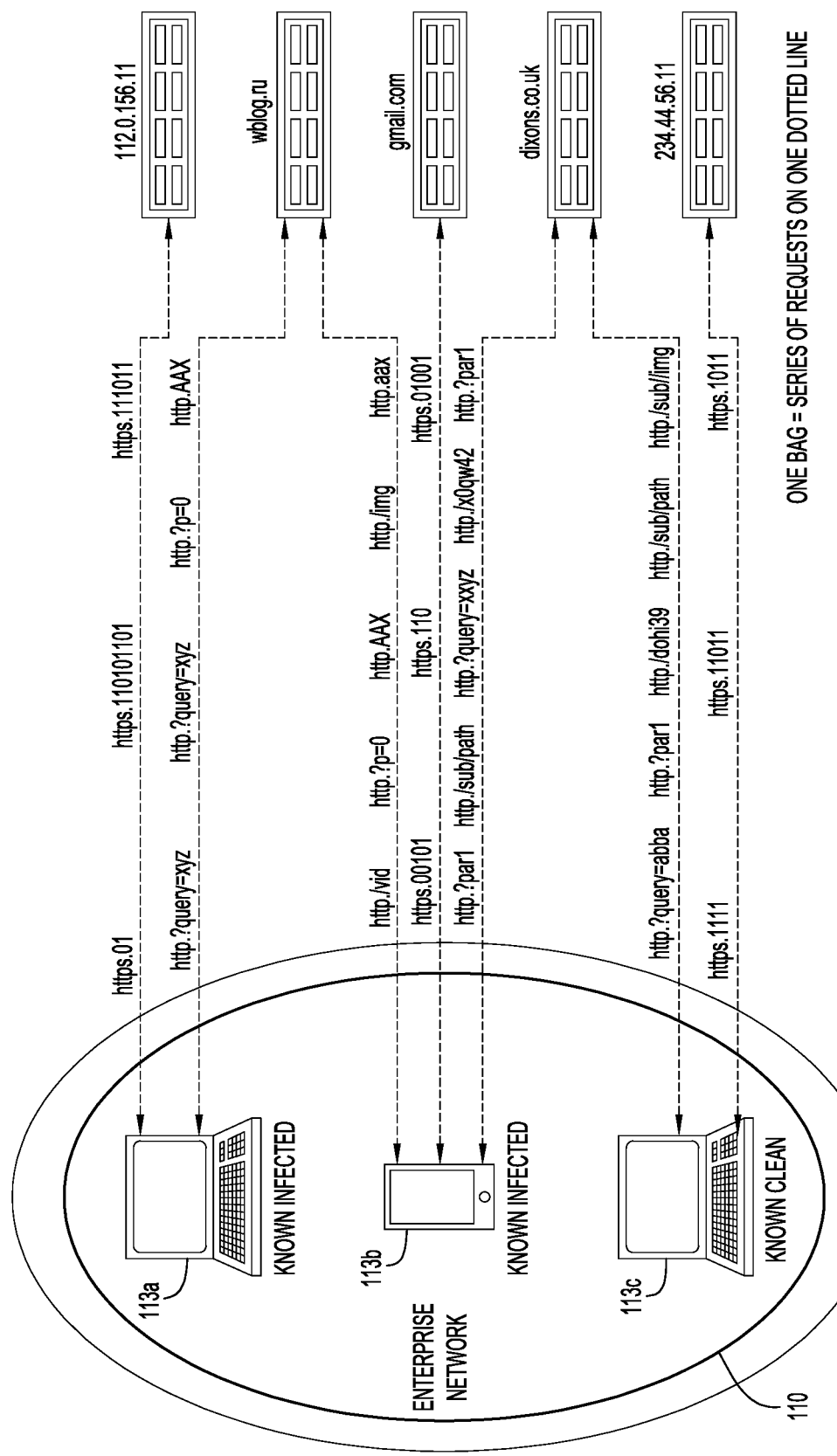
FIG. 2 is a representation of traffic flowing between computers within an enterprise and multiple external domains, with individual flows organized as bags in accordance with an example embodiment.

FIG. 2 is a representation of traffic flowing between computers 113a, 113b, 113c within enterprise 110 and multiple external domains, with individual flows. The individual flows from multiple domains to a given single user can be aggregated or organized as a bag in accordance with an example embodiment.

Figure 3:
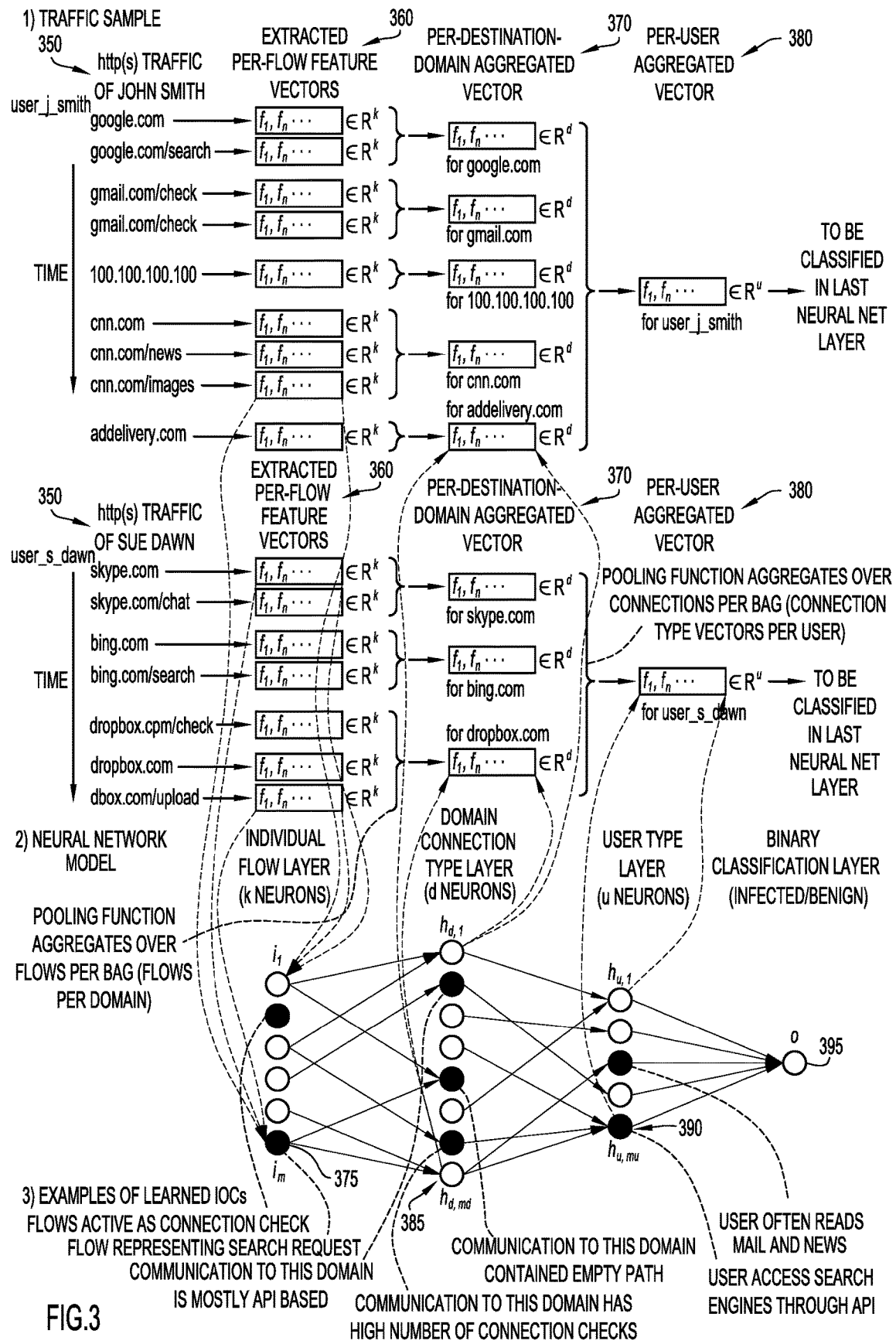
FIG. 3 depicts the aggregation of traffic through a neural network in accordance with an example embodiment.

Reference is now made to FIG. 3, which shows how traffic 350 (e.g., traffic 152 in FIG. 1, and the individual flows shown in FIG. 2, arranged into bags by user (e.g., user_j_smith, user_s_dawn), is broken down into feature vectors 360 per flow, which are aggregated into per-destination-domain vectors 370, which are then further aggregated to obtain a per-user aggregated vector 380.

The object of these aggregations is to learn the difference in behavior of clean versus infected users. Observations confirm that discovery of high-end malware improves greatly with structural and context-sensitive IOCs. Examples of IOCs include, as indicated at the bottom of FIG. 3, "flow active as connection check," "flow representing search request," "communication to this domain is mostly API based," "communication to this domain has high number of connection checks," "communication to this domain contained empty path," user accesses search engines through API, " or "user often reads mail and news," among other possibilities.

The methodology described below aims to learn IOCs automatically from labels available only on the level of users. To create training data, an analyst need only mark each network node (user) as infected or clean, instead of tediously analyzing and labeling an excessive number of individual HTTP(s) requests. The embodiments described herein then find how the users' traffic differs, and finds the common as well as distinct traffic patterns. Thus, the approach described herein effectively learns IOCs and also their weighted combination leading to accurate detection of infected users.

In one implementation, the neural network of the malware detection logic 200 comprises two hidden NN layers, that are supplied initial per-flow feature vectors 360 via inputs 375.

The first hidden NN layer, domain model, shown as 385 in FIG. 3, is intended to model types of user's traffic to domains (or destination IP addresses). Each neuron in the layer 385 learns to recognize particular (unknown) types of connections. Thus, neurons in the domain model 385 receive, via inputs 375, bags of connections between a single user and single domain, and output their decision, which is a single real number. Since the domain model 385 is composed of multiple neurons, its output is one real vector for every domain the user has visited (i.e., for each bag entering layer 385).

The second hidden NN layer, user model, shown as 390 in FIG. 3, is intended to model types of users. Its neurons learn the particular patterns in traffic that are specific for infected users. The neurons consume the output of the domain model. Since the user has probably visited many domains, the domain model can produce a varying number of output vectors, forming a higher-level "bag of domain connection behaviors". Thus, neurons in the user model 390 take such higher-level bags and output their decision which is again a single real number.

Note that while processing samples in a bag, both the domain model 385 and user model 390 aggregate individual-sample outputs per neuron to produce a single output value. For this function, the use of a maximum or average aggregator, among others, may be employed to produce or generate the single output value.

In one implementation, input vectors are representative of individual HTTP(s) requests. Referring to FIG. 2, the black dots represent a plurality of HTTP sessions, which are sampled to produce the input vector. In one example, individual samples were transformed into vectors of 550 features. Feature examples include: 1) HTTP protocol used, 2) number of subdomains present in URL, 3) length of User-Agent string (indicates also whether the user agent is present), 4) domain popularity (e.g., taken from Alexa database), 5) (logarithm of the number of) bytes transferred from client to server, 6) bytes transferred from server to client, 7) presence of a specific "xyz" n-gram in the domain name (e.g., from all possible n-grams use those with below-average frequency), 8) presence of self-signed certificate, 9) referrer for the request is available?, 10) HTTP status of the connection (e.g., connection is a redirection/success/error/ . . . ), 11) maximum length of continuous lower case characters in URL, 12) maximum length of continuous upper case characters in URL, 13) duration of TCP connection, 14) length of URL path, 15) length of URL query, 16) status of the HTTP request, 17) client port, 18) server port, 19) is connection to raw IP address, among others.

Input bags enter the first hidden layer which outputs for each bag one output vector; a collection of such vectors then enters as higher-level bag the second hidden layer to eventually produce one final output vector. See FIG. 3, vector 380. This vector is then transformed to a single value 295 that expresses the classifier decision. Back-propagation then propagates back weight changes depending on how the classifier output corresponded to the known user-level label in the training set.

Note that while the classifier is learned using the user-level labels and is thus learned in a supervised way, the underlying structure of neuron weights in lower-level hidden layers is effectively trained in an unsupervised way; the top-level label does affect the weight updates but does not determine the model's ability to reveal the patterns in underlying data distribution.

A more formal description of the foregoing follows.

As explained, the goal is to classify users on the basis of their connections into two or more classes (in this case, just two classes: clean and infected). This means that one sample (bag), b; consists of all network connection of one user and it is not known which connections within are caused by the malware and which are of the user or the operating system.

The set of all bags (also users or samples), is denoted by $b \in \mathcal{B}$. Set of all observed connections of all users will be denoted by $x \in X, x \in \mathbb{R}^m$, with $X_b$ being set of connections of user b; and $x_{b:d}$ being set of connections of a user b going to domain d. The set $\mathcal{D}_b$ is the set of domains contacted by the user b. Finally $y_b$ is a label of a user b (infected/clean). In this work $y_b \in \{-1, +1\}$ The essence of the approach described herein is to model the classification system in two layers. The first layer, domain model, is intended to model traffic to domains (or destination IP addresses), d. Its detectors (neurons) within should recognize particular type of connections, for example download of advertisements, the domain name in the request was generated by a domain generating algorithm (DGA), etc. The second layer, user model, is intended to model users and its detectors learn that particular combinations of traffic are unique for infected users.

Both layers can be described by functions $f_d: \cup_{k \geq 1} \mathbb{R}^{k,m} \to \mathbb{R}^{m_d}$ and $f_b: \cup_{k \geq 1} \mathbb{R}^{k,m_d} \to \mathbb{R}^{m_b}$, respectively. Since the number of user's connections and number of contacted domains by user varies across users, both functions $f_d$ and $f_b$ are be configured to accept unknown number of input vectors of size $\mathbb{R}^m$, $\mathbb{R}^{m_d}$ respectively. This is symbolized in the above notation by domain of functions being rectangular matrices with any number of rows. The composite function $f_b(\cup_{d \in \mathcal{D}_b} f_d(x_{b:d}))$ models the user by a single $m_d$-dimensional vector. Thus, there is one vector of fixed dimension to one label, which enables the use any machine-learning algorithms. The challenge is, how to choose/learn functions (models) $f_d$ and $f_b$.

The problem can be elegantly solved if the function composition is viewed as a neural network with aggregation functions of choice, e.g., minimum, maximum, applied in two separate layers and learning $f_d$ and $f_b$ using a back-propagation algorithm. The approach is outlined in FIG. 3. Units (neurons) $i_1, \ldots, i_m$ in the input layer 375 do not have any weights as they simply distribute the input feature vector, $x \in \mathbb{R}$ (describing one connection) to neurons in the next layer 385 modeling the domains (domain models denoted as $h_{d:1}, \ldots, h_{d:m_d}$). The domain models aggregate feature vectors of all user's connections to each domain, d; and for each domain outputs a single vector $x_{b:d} \in \mathbb{R}^{m_b}$. This set of vectors (one for each domain contacted by the user) is forwarded to user models (users models denoted as $h_{b:1}, \ldots, h_{b:m_b}$), which aggregate them and output a single vector $x_{b:d} \in \mathbb{R}^{m_b}$ describing the user. This vector is used in the final classifier to provide the decision. As noted, both layers $f_d$, $f_b$ and the final classifier can be implemented as a multi-layer neural network. Moreover, the model can be extended to have more aggregation layers, if for example there is meta-information that allows further sub-grouping of connections or connections can be broken down to simpler entities.

Example of an Implementation

In an example implementation, neurons in the domain and user models layer were implemented by reluMax units as $$f_d(x_{b:d}) = (\max\{\{0, \max_{x \in X_{b:d}}\{w_{d,1}^T x + v_{d,1}\}\}, \ldots, \max\{\{0, \max_{x \in X_{b:d}}\{w_{d,m_d}^T x + v_{d,m_d}\}\}\}) \quad (1)$$

and $$f_d(x_b) = (\max\{\{0, \max_{d \in D_b}\{w_{b,1}^T f_d(x_{b:d}) + v_{b,1}\}\}, \ldots, \max\{\{0, \max_{d \in D_b}\{w_{b,1}^T f_d(x_{b:d}) + v_{b,m_d}\}\}\}) \quad (2)$$

Inner maximums $\max_{x \in X_{b:d}}$ (1) aggregate multiple connections to single domain (domain models) and $\max_{d \in D_b}$ in (2) aggregates user's connections to multiple domains. The output classifier o; is a simple linear classifier $\text{sign}(w_o^T f_d(X_b) + v_o)$ with sign being the signum function. The whole model is parametrized by weights $w_d \in \mathbb{R}^{k,m_d}$, $w_b \in \mathbb{R}^{m_d,m_b}$, $w_o \in \mathbb{R}^{m_b}$, $v_d \in \mathbb{R}^{m_d}$, $v_b \in \mathbb{R}^{m_b}$, $v_o \in \mathbb{R}$ which are optimized with a gradient calculated by a back-propagation algorithm. The error function is a simple hinge-loss of the form $l(y_b, o_b) = \max\{0, 1 - y_b o_b\}$. The ADAM algorithm (Kingma, D. et al., "Adam: A Method for Stochastic Optimization," 2015) was used with default settings and with gradient estimated from 50 randomly selected clean bags and 50 randomly selected infected bags.

The above neural network was evaluated in two scenarios in network intrusion detection differing by the source of the data. In the first scenario the data included HTTP proxy logs obtained from a cloud web security system. In the second scenario the data included NetFlow records enhanced by the information about length and timings of individual packets.

First Embodiment—HTTP Proxy Logs

One HTTP(s) connection is described by a 287 dimensional vector developed for the classification layer of a Cognitive Threat Analytics (CTA) engine. One sample (bag) describing user's traffic from a five-minute long observation window consists of a set of 287-dimensional vectors, each describing one HTTP(s) connection. The CTA engine identified users infected by the malware using DGA algorithm, and this labeling was used as a ground truth. Although this labeling is not perfect, the goal here was to demonstrate that the instant approach can learn from labels provided on the level of bags rather than on level of individual HTTP requests. The dataset contained 15,055,979 HTTP requests from 24,627 users out of which 1,471 were labeled as infected. Note that some bags contain as many as 50,000 requests which demonstrates the difficulty of labeling requests within. The data were split into training and testing sets on the level of users, such that 50% of users were used for training and the rest for testing. Both domain and user models consisted of single layer of 20 reluMax neurons as described in (1) and (2). The ADAM algorithm was allowed to run for $2 \cdot 10^4$ iterations with gradient estimated from 100 randomly selected bags in each iteration (50 clean, 50 infected).

After the training, the error was $3.29 \cdot 10^{-4}$ ($P_{FP} = 3.29 \cdot 10^{-4}$, $P_{FN} = 0.0$) on the training set and 0.0048 ($P_{FP} = 0.0021$, $P_{FN} = 0.0506$) on the testing set. The fact that the described embodiment achieved nearly zero error on the training set and optimistic 0.2% error on the testing set demonstrates that it has learned to identify infected users. Moreover, notice that the false positive rate on the testing set is about 0.1% which is very favorable.

Recall that one of the goals of the instant embodiments is to learn the type of traffic typical for malware that indicate infected users (indicators of compromise, IOC). The learnt IOCs can be very weak if used independently of each other, but their combination enabled by user model layer yields a very strong classifier, since the error probability is less than 0.5%.

In this regard, investigation was undertaken related to the types of HTTP connections to which neurons in the domain model layer are the most sensitive. The sensitivity of $i^{th}$-neuron to HTTP request with feature vector x was measured as $\max\{0, w_{d,i}^T x + v_{d,i}\}$. By looking at connections with the highest score, it was possible to identify which connections the neuron recognizes. Listed below are several connections of interest together with the assumed type of learnt traffic.

HTTPs connections to raw IP addresses like
hxxps://62.249.33.21/
DGA domains like
hxxp://ivdyxgqtwqsztopjrijlnhqwcnbtk.com,
hxxp://pojxofukqskfhajvizdhmdxwwghq.biz, and
hxxp://twwkgihmmvspblrnzpnjnhexcqgtkrk.com
HTTPs connections to live.com domain like
hxxps://roaming.officeapps.live.com/[ow]
Download of images like
http://www.biglots.com/images/aprimo/common/holiday_header/110714-04.gif
Seemingly legitimate traffic like
hxxp://banners.itunes.apple.com/js/banner-main-built.js or
hxxp://www.slfn.co.uk/today_matchsheet.php.

The first two types are well known to be related to malware. The third one is interesting, since live.com is a legitimate domain belonging to Microsoft. Nevertheless, search on malware blogs revealed that it is indeed used by malware. The last two types seem to be related to advertisements, which would suggest that the system has learnt that advertisement is a sign of malware infection. This also makes sense as the malware monetize infections by doing click-fraud. The learnt indicators of compromise seem to make sense, but they are not the type security researchers would create manually, because using them individually would lead to very high false positive rate. Notably, the system learned DGA indicator of compromise without knowing what it is, which demonstrates its practical utility.

Second Embodiment—NetFlow Records

Enhanced Threat Telemetry and Analytics (ETTA) is a project whose goal is to investigate how statistics exported in NetFlow and IPFIX about network connections can be enriched to get better visibility into the flows and to improve the accuracy in detecting infected users/malware. An experimental database was created by using traffic of few users captured during ETTA. This traffic was used as a background (considered clean), since all computers came from a protected network. The bags were created by grouping the flows by an IP address, which means that bags contained mixture of users and servers. Infected users were simulated by mixing the traffic captured during 5-minute long execution of the malware within ThreatGRID sandbox. The mixing was implemented by changing the IP address, which was sufficient. Note that in this case, we are effectively trying to detect an event, when user has just downloaded the malicious payload which is executed. As in the previous case, the time window of one bag was set to five minutes, which is also the length of malware's execution in ThreatGRID sandbox. A notable difference to experiment with HTTP logs is the replacement of domains by destination IP addresses, since not all flows were HTTP connection. The training set contained traffic from 6132 users collected during 11 days (with a 14 day break after the fifth day), which after division into batches yielded to 2,132,446 samples. Thus, the training set contained traffic from five days, and the testing set contained traffic from six days, such that the time-difference between both sets was 14 days. To simulate infected users, traffic collected in sandbox was mixed into randomly selected users. Samples of 237,100 binaries were taken from the sandbox.

Each connection was described by an 80-dimensional vector, consisting of sizes and inter-packet times of first twenty incoming and first twenty outgoing packets. These features are very simple and used as is, without any other processing except normalizing by log(1+x) to reduce their dynamic range. All settings as the configuration of the neural network, the training algorithm, its number of allowed connections, etc. were the same as in the previous HTTP case.

The error of the classifier was 0.0093 ($P_{FP}$=0.0061, $P_{FN}$=0.0124) on the training set and 0.0111 ($P_{FP}$=0.0083, $P_{FN}$=0.0139) on the testing set. As in the previous case, investigation was made as to the types of connections the domain (destination IP) models have learned, though this was more difficult, since there was no information about the URLs. Nevertheless, it could be surmised according to the information about destination IP address and if the flow came from the sandbox or from a user. Based on this information, neurons have been found to be sensitive to connection checks or pings, with only one incoming and outgoing packet typically to google servers, to connections to sinkhole server located to Poland, but also neurons sensitive web conferencing (this is due to the nature of our background data). These again demonstrate that the neurons in the domain (destination IP) modeling layer learn useful types of traffic, albeit not being always individually usable IOC.

Third Embodiment—Domain-centric System Based on Telemetry Data

The first embodiment assumed availability of user-level labels. A "shallower" system can be defined with only one hidden NN layer, taking use of domain-centric labels, e.g., from blacklists. Such a neural network may be trained only from bags representing user-domain connections. The resulting IOCs would represent patterns extracted from traffic per domain.

Fourth Embodiment—Binary-hash-centric System Based on Sandbox Data

A version of the approach from the previously described embodiments can be modified for analyzing behaviors of executable files. The training data would come from a sandbox or any other network sensor capable attaching a hash of the process to each log entry (e.g., ThreatGRID or Advanced Malware Protection (AMP)), covering logs of respective executable's system calls, network traffic, caused changes to file system, etc. Labels are available per executable (hash), highest level bags would cover complete executable activity capture. Lower-level bags can be certainly defined taking use of inherent data structure (activity time windows, sys calls of various types, structuring of file system access according to destination, etc.).

The result would be a classification system as well as IOCs describing in previously unknown detail the inner patterns in executable activities.

Other Possible Implementation and Enhancements

More Descriptive Power by Extended Aggregators

In the first embodiment all neurons employed the same aggregator function: maximum. The intuition is to let the system emphasize such individual detailed pattern(s) in the bag traffic that have the most striking effect on overall efficacy. It is fast and well interpretable. The maximum function, however, does not take into the account the volume of the type of the IOCs, which can be undesirable (e.g., IOC of showing advertisement).

If maximum function is replaced by average, the system would put emphasis on less detail but more on prevailing characteristics over whole bags. This would improve robustness against noise but reduce the attention to detail—will not trigger on spikes in traffic. Replacing maximum by average in all neurons can lead to loss of detection power according to experiments.

However, there are other ways to modify neural networks where one or multiple of the following are implemented to enrich the model's expressive power:

In one approach, the aggregator function is defined as a parametrized generic function where the parameter gets optimized as part of network learning. A good example is q-th root of a sum of q-th powers. Higher q moves the function closer to maximum, lower q>1 moves it closer to average.

In another approach, multiple aggregator functions, maximum, average and/or the generic aggregator are performed in parallel, increasing the number of neurons per layer.

Deepening the Neural Network to Learn a Hierarchy of IOCs

In the foregoing embodiments, a small number of NN layers are implemented, and can be described as "shallow". They partially emulate the power of deep networks by modeling the structure in bags; however, the hierarchy of bags is pre-specified, e.g., flows over a predetermined amount of time. The power of deep neural networks in image analysis consists in the ability to model arbitrarily deep hierarchies of patterns in data. The embodiments described herein can also be extended to allow automatic learning of hierarchy depth as well.

Specifically, an equivalent to the "convolution kernel" trick from classical Deep Learning is employed, where a parameterized function reflects context in data to various extent while the learning algorithms optimizes the parameter. This is more difficult in network security than in image analysis due to less inherent structure in data—unlike the regular matrix of pixels in images the network data are highly irregular and diverse.

However, a "convolution" can be defined over network events in time. It is known that context in traffic matters (e.g., if certain signals are preceded by connection check, their maliciousness probability is higher). Hence it is possible to define time context windows of parameterized size (the window would aggregate information from network events within its reach), allowing for both automated window parameter optimization and hierarchical stacking of such windows in varying levels of coarseness.

A difference from the first embodiment is in the definition of what is a bag and consequently how NN layers are constructed. In the first embodiment bags have pre-specified types, i.e., humans have defined how to group samples to bags, and the NN has consequently a corresponding number of levels. In contrast, a deep architecture can decide itself as part of the optimization process. Hence a parameterized definition of a bag is employed with optimizable parameters. The time window is a viable installment of parameterized bag. The number of NN layers would then be set significantly higher to let the optimizer assign weights to neurons as needed for the accuracy of the model.

Correlating Multiple Types of Data for More Complex IOC Discovery

In the foregoing embodiments it is assumed that the network is trained on a single type of data. Experience confirms that correlating various sources of data often leads to better efficacy.

Thus, the embodiments described herein can be extended to build joint models over multiple types of data. This can be achieved in multiple ways, including: connecting multiple input vectors to the first network layer; or using supplemental data to define bags in primary data.

Figure 4:
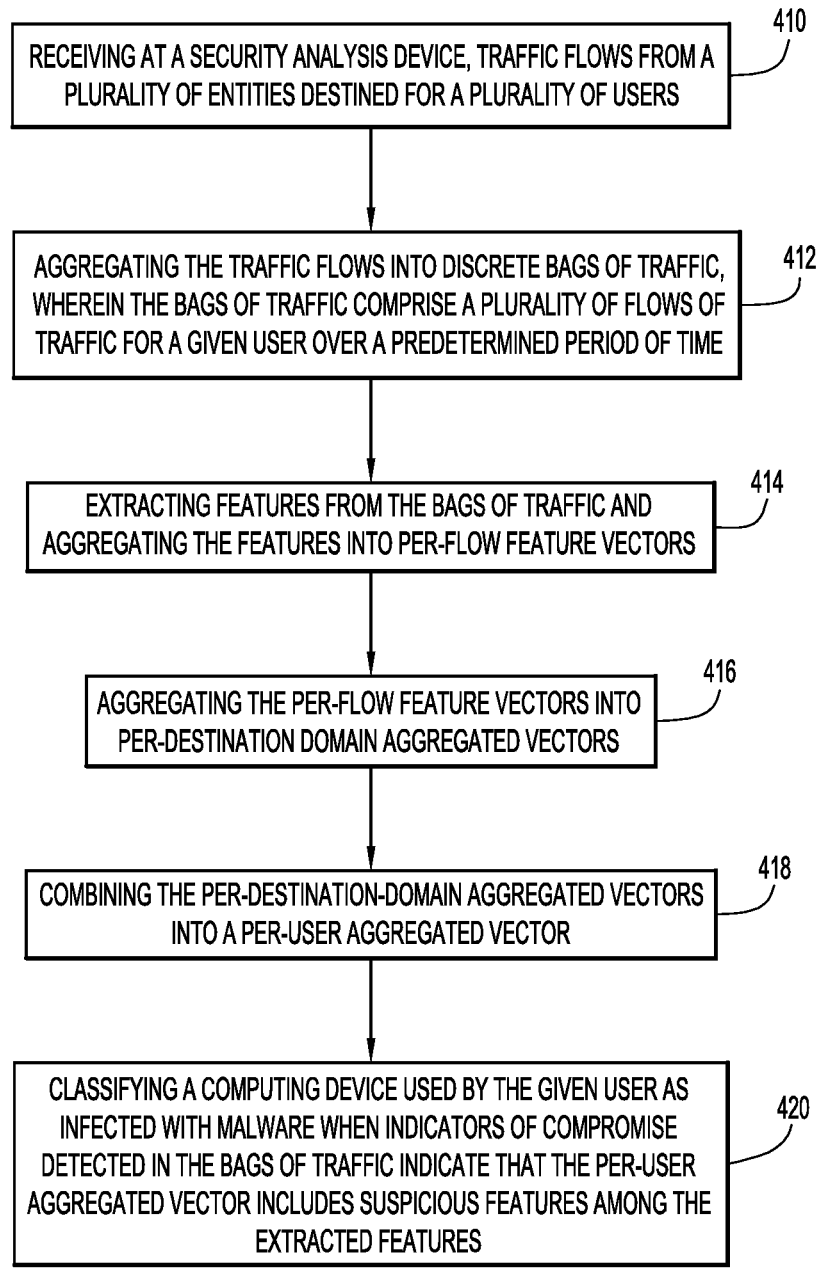
FIG. 4 is a flowchart depicting a series of operations in accordance with an example embodiment.

Reference is now made to FIG. 4, which is a flowchart depicting a series of operations in accordance with an example embodiment. These operations may be performed by malware detection logic 200 that is loaded on, e.g., gateway 115 or separate server 117, either of which can function as a security analysis device. The operations include, at 410, receiving at a security analysis device, traffic flows from a plurality of entities destined for a plurality of users, at 412, aggregating the traffic flows into discrete bags of traffic, wherein the bags of traffic comprise a plurality of flows of traffic for a given user over a predetermined period of time, at 414, extracting features from the bags of traffic and aggregating the features into per-flow feature vectors, at 416, aggregating the per-flow feature vectors into per-destination domain aggregated vectors, at 418, combining the per-destination-domain aggregated vectors into a per-user aggregated vector, and, at 420, classifying a computing device used by the given user as infected with malware when indicators of compromise detected in the bags of traffic indicate that the per-user aggregated vector includes suspicious features among the extracted features In sum, described is a hierarchical Neural Network system capable of detecting network threats. The system has unique practical properties. I performs as high-precision detector of threats. It is learned from training data with dramatically lower requirements on labels provided by human analysts— this makes it practical for Big Data analytics. It is capable of learning and revealing novel Indicators of Compromise (IOCs) that are unlikely to be discovered by human analysts. The system can be implemented to consume various types of data. An important feature underlying the ability to accomplish the foregoing, is to treat data samples in a hierarchy of groups ("bags"); individual hidden Neural Network layers then represent the respective bag granularity and learn otherwise invisible structures inside bags on the given level of granularity. Only the last output layer uses labels.

The methodology described herein is capable of learning from Big Data due to its ability to learn from very small number of labels describing very grossly a large amount of training data. This removes a significant bottleneck caused by cost of human analysis.

The methodology further learns to classify entities on various levels of abstraction; in the tested installment it provides verdicts about users (infected/clean); the verdict can be analyzed and explained.

The methodology also automatically learns Indicators of Compromise (IOCs) that would otherwise be difficult or impossible to define by human analysts.

The methodology is general, and has been verified on two types of input data. In both cases its efficacy was proven.

Finally, the methodology has the potential to increase accuracy of many products classifying users based on observed network connection. In other embodiments, it has the potential to improve efficacy of sandbox solutions as well as boost the efficacy of security products as a whole when utilizing correlations between data of various type.

Figure 5:
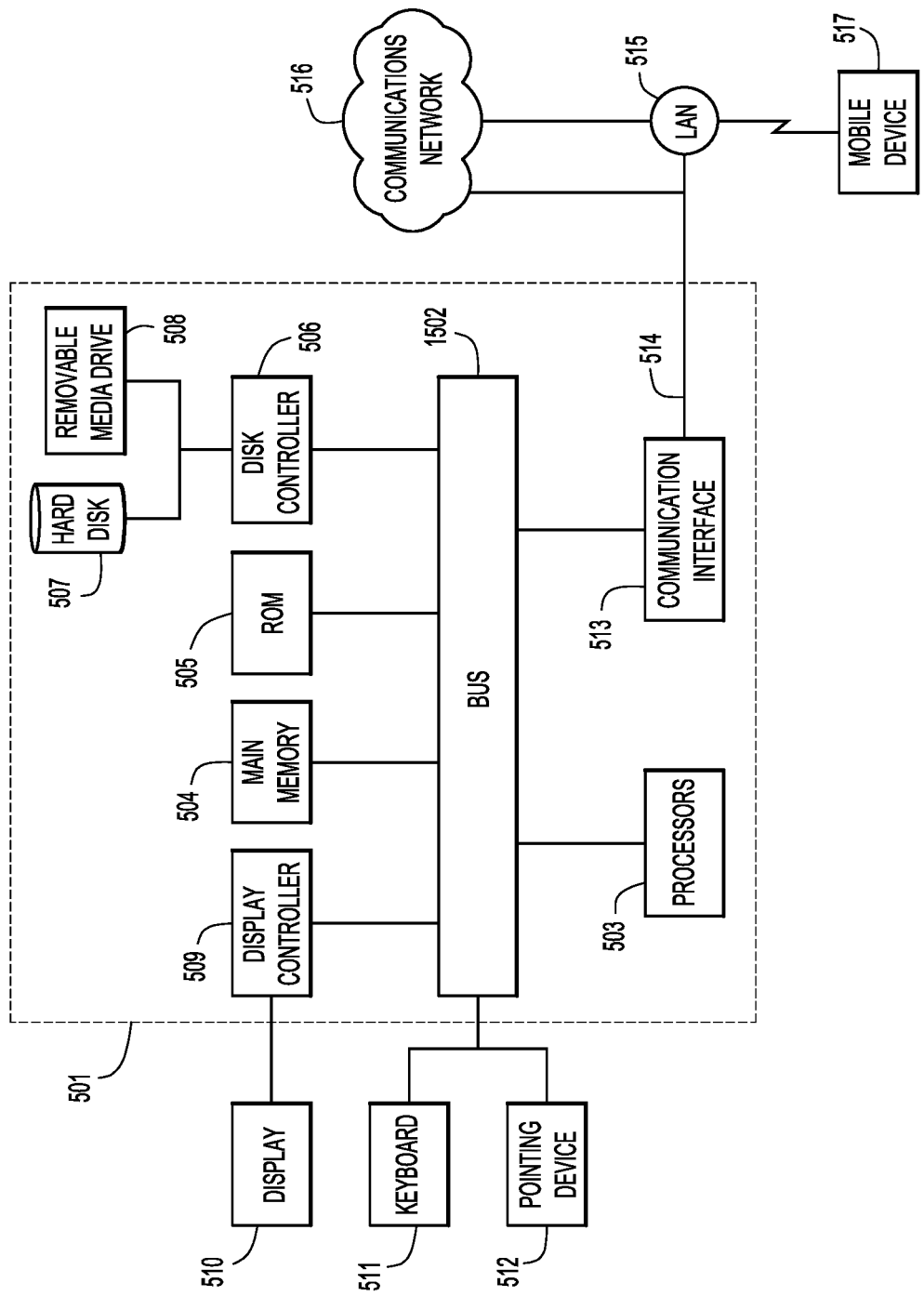
FIG. 5 is a block diagram that illustrates a computer system or apparatus upon which an embodiment of the disclosed malware detection system may be implemented.

FIG. 5 depicts an apparatus that is configured to operate as a security analysis device or apparatus that hosts malware detection logic 200 according to an example embodiment. The apparatus may be implemented on a computer system 501. The computer system 501 may be programmed to implement a computer based device. The computer system 501 includes a bus 502 or other communication mechanism for communicating information, and a processor 503 coupled with the bus 502 for processing the information. While the figure shows a single block 503 for a processor, it should be understood that the processor 503 represents a plurality of processors or processing cores, each of which can perform separate processing. The computer system 501 may also include a main memory 504, such as a random access memory (RAM) or other dynamic storage device (e.g., dynamic RAM (DRAM), static RAM (SRAM), and synchronous DRAM (SD RAM)), coupled to the bus 502 for storing information and instructions to be executed by processor 503. In addition, the main memory 504 may be used for storing temporary variables or other intermediate information during the execution of instructions by the processor 503. Main memory may also be used to store logic instructions or software for performing the operations shown in FIG. 4.

The computer system 501 may further include a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The computer system 501 may also include a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 501 may also include a display controller 509 coupled to the bus 502 to control a display 510, such as a cathode ray tube (CRT) or liquid crystal display (LCD), for displaying information to a computer user. The computer system 501 may include input devices, such as a keyboard 511 and a pointing device 512, for interacting with a computer user and providing information to the processor 503. The pointing device 512, for example, may be a mouse, a trackball, or a pointing stick for communicating direction information and command selections to the processor 503 and for controlling cursor movement on the display 510. In addition, a printer may provide printed listings of data stored and/or generated by the computer system 501.

The computer system 501 performs a portion or all of the processing operations of the embodiments described herein in response to the processor 503 executing one or more sequences of one or more instructions contained in a memory, such as the main memory 504. Such instructions may be read into the main memory 504 from another computer readable medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 501, for driving a device or devices for implementing the described embodiments, and for enabling the computer system 501 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 501 also includes a communication interface 513 coupled to the bus 502. The communication interface 513 provides a two-way data communication coupling to a network link 514 that is connected to, for example, a local area network (LAN) 515, or to another communications network 516. For example, the communication interface 513 may be a wired or wireless network interface card or modem (e.g., with SIM card) configured to attach to any packet switched (wired or wireless) LAN or WWAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local are network 515 (e.g., a LAN) or through equipment operated by a service provider, which provides communication services through a communications network 516. The local network 514 and the communications network 516 use, for example, electrical, electromagnetic, or optical signals that carry digital data streams, and the associated physical layer (e.g., CAT 5 cable, coaxial cable, optical fiber, etc.). The signals through the various networks and the signals on the network link 514 and through the communication interface 513, which carry the digital data to and from the computer system 501 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 501 can transmit and receive data, including program code, through the network(s) 515 and 516, the network link 514 and the communication interface 513. Moreover, the network link 514 may provide a connection to a mobile device 517 such as a personal digital assistant (PDA) laptop computer, cellular telephone, or modem and SIM card integrated with a given device.

In summary, in one form, a method is provided comprising: receiving, at a security analysis device, traffic flows from a plurality of entities destined for a plurality of users; aggregating the traffic flows into discrete bags of traffic, wherein the bags of traffic comprise a plurality of flows of traffic for a given user over a predetermined period of time; extracting features from the bags of traffic and aggregating the features into per-flow feature vectors; aggregating the per-flow feature vectors into per-destination domain aggregated vectors; combining the per-destination-domain aggregated vectors into a per-user aggregated vector; and classifying a computing device used by a given user as infected with malware when indicators of compromise detected in the bags of traffic indicate that the per-user aggregated vector for the given user includes suspicious features among the extracted features.

In another form, an apparatus is provided comprising: a network interface unit configured to enable communications via a network; a memory configured to store logic instructions; and a processor, when executing the logic instructions, configured to receive traffic flows from a plurality of entities destined for a plurality of users; aggregate the traffic flows into discrete bags of traffic, wherein the bags of traffic comprise a plurality of flows of traffic for a given user over a predetermined period of time; extract features from the bags of traffic and aggregating the features into per-flow feature vectors; aggregate the per-flow feature vectors into per-destination domain aggregated vectors; combine the per-destination-domain aggregated vectors into a per-user aggregated vector; and classify a computing device used by a given user as infected with malware when indicators of compromise detected in the bags of traffic indicate that the per-user aggregated vector for the given user includes suspicious features among the extracted features.

In still another form, one or more non-transitory computer readable storage media are provided encoded with software comprising computer executable instructions and when the software is executed operable to: receive traffic flows from a plurality of entities destined for a plurality of users; aggregate the traffic flows into discrete bags of traffic, wherein the bags of traffic comprise a plurality of flows of traffic for a given user over a predetermined period of time; extract features from the bags of traffic and aggregating the features into per-flow feature vectors; aggregate the per-flow feature vectors into per-destination domain aggregated vectors; combine the per-destination-domain aggregated vectors into a per-user aggregated vector; and classify a computing device used by a given user as infected with malware when indicators of compromise detected in the bags of traffic indicate that the per-user aggregated vector for the given user includes suspicious features among the extracted features.

The above description is intended by way of example only. Various modifications and structural changes may be made therein without departing from the scope of the concepts described herein and within the scope and range of equivalents of the claims.

What is claimed is:

1. A method comprising:
   receiving, at a security analysis device, via a gateway of an enterprise computing environment, traffic flows from a plurality of entities destined for a plurality of users;
   aggregating the traffic flows into discrete bags of traffic, wherein the bags of traffic comprise a plurality of flows of traffic for a given user, within the enterprise computing environment, over a predetermined period of time;
   extracting features from the bags of traffic and aggregating the features into per-flow feature vectors;
   aggregating the per-flow feature vectors into per-destination domain aggregated vectors;
   combining the per-destination-domain aggregated vectors into a per-user aggregated vector;
   classifying a computing device used by the given user as infected with malware when indicators of compromise detected in the bags of traffic indicate that the per-user aggregated vector for the given user includes suspicious features among the extracted features;
   inputting the bags of traffic to input nodes of a neural network,
   wherein the neural network comprises an input node layer, a domain model layer that models traffic of the given user to respective domains, and a user model layer that models patterns in traffic that are specific for infected individual users in the plurality of users, the method further comprising:
   operating the neural network to identify the indicators of compromise (IOCs) at at least one of the input node layer, the domain model layer and the user model layer.

2. The method of claim 1, wherein the predetermined period of time is about five minutes.

3. The method of claim 1, wherein receiving the traffic flows comprises receiving Hypertext Transfer Protocol (HTTP) traffic.

4. The method of claim 1, wherein individual neurons in the domain model layer and the user model layer aggregate individual sample outputs to produce a single output value, respectively.

5. The method of claim 1, further comprising employing a maximum function to generate the single value.

6. The method of claim 1, further comprising employing an average function to generate the single value.

7. The method of claim 1, wherein the indicators of compromise comprise at least one of a predetermined IP address, a domain generating algorithm (DGA) domain name, a predetermined universal resource locator (URL), or a download of an image.

8. The method of claim 1, wherein the per-flow feature vectors and the per-destination-domain aggregated vectors are of arbitrary size.

9. An apparatus comprising:
   a network interface unit configured to enable communications via a network;
   a memory configured to store logic instructions; and
   a processor, when executing the logic instructions, configured to
   receive traffic flows, via a gateway of an enterprise computing environment, from a plurality of entities destined for a plurality of users;
   aggregate the traffic flows into discrete bags of traffic, wherein the bags of traffic comprise a plurality of flows of traffic for a given user, within the enterprise computing environment, over a predetermined period of time;
   extract features from the bags of traffic and aggregating the features into per-flow feature vectors;
   aggregate the per-flow feature vectors into per-destination domain aggregated vectors;
   combine the per-destination-domain aggregated vectors into a per-user aggregated vector;
   classify a computing device used by the given user as infected with malware when indicators of compromise detected in the bags of traffic indicate that the per-user aggregated vector for the given user includes suspicious features among the extracted features,
   input the bags of traffic to input nodes of a neural network,
   wherein the neural network comprises an input node layer, a domain model layer that models traffic of the given user to respective domains, and a user model layer that models patterns in traffic that are specific for infected individual users in the plurality of users, and wherein the processor, when executing the logic instructions, is further configured to:
   operate the neural network to identify the indicators of compromise (IOCs) at at least one of the input node layer, the domain model layer and the user model layer.

10. The apparatus of claim 9, wherein the processor, when executing the logic instructions, is further configured to:
    set the predetermined period of time to about five minutes.

11. The apparatus of claim 9, wherein the processor, when executing the logic instructions, is further configured to:
    receive traffic flows that comprise Hypertext Transfer Protocol (HTTP) traffic.

12. The apparatus of claim 9, wherein individual neurons in the domain model layer and the user model layer aggregate individual sample outputs to produce a single output value.

13. The apparatus of claim 12, wherein the processor, when executing the logic instructions, is further configured to:
employ a maximum function to generate the single value.

14. The apparatus of claim 12, wherein the processor, when executing the logic instructions, is further configured to:
employ an average function to generate the single value.

15. One or more non-transitory computer readable storage media encoded with software comprising computer executable instructions and when the software is executed operable to:
receive traffic flows from a plurality of entities destined for a plurality of users;
aggregate the traffic flows into discrete bags of traffic, wherein the bags of traffic comprise a plurality of flows of traffic for a given user over a predetermined period of time;
extract features from the bags of traffic and aggregating the features into per-flow feature vectors;
aggregate the per-flow feature vectors into per-destination domain aggregated vectors;
combine the per-destination-domain aggregated vectors into a per-user aggregated vector;
classify a computing device used by the given user as infected with malware when indicators of compromise detected in the bags of traffic indicate that the per-user aggregated vector for the given user includes suspicious features among the extracted features;
input the bags of traffic to input nodes of a neural network, wherein the neural network comprises an input node layer, a domain model layer that models traffic of the given user to respective domains, and a user model layer that models patterns in traffic that are specific for infected individual users in the plurality of users; and
operate the neural network to identify the indicators of compromise (IOCs) at at least one of the input node layer, the domain model layer and the user model layer.

* * * * *